United States Patent
Gleine et al.

(10) Patent No.: US 6,587,188 B2
(45) Date of Patent: Jul. 1, 2003

(54) METHOD AND SENSOR ARRANGEMENT FOR MEASURING TEMPERATURE AND STRAIN USING AN OPTICAL FIBER EMBEDDED IN A COVER LAYER ON A SUBSTRATE

(75) Inventors: Wolfgang Gleine, Kakenstorf (DE); Michael Trutzel, Blaustein/Ulm (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/775,866

(22) Filed: Feb. 2, 2001

(65) Prior Publication Data

US 2001/0026362 A1 Oct. 4, 2001

(30) Foreign Application Priority Data

Feb. 2, 2000 (DE) .......................................... 100 04 384

(51) Int. Cl.[7] .............................................. G01B 11/16
(52) U.S. Cl. ........................................... 356/32; 356/34
(58) Field of Search .............................. 356/32, 33, 34, 356/35; 250/227.14, 227.15, 227.16, 227.17; 73/800

(56) References Cited

U.S. PATENT DOCUMENTS

| | | |
|---|---|---|
| 4,629,318 A | 12/1986 | Malek et al. |
| 4,724,316 A | 2/1988 | Morton |
| 4,808,814 A | 2/1989 | Hofer et al. |
| 4,900,920 A | 2/1990 | Federmann et al. |
| 4,906,068 A * | 3/1990 | Olson et al. ............... 350/96.3 |
| 5,042,897 A | 8/1991 | Meltz et al. |
| 5,293,440 A * | 3/1994 | Miles et al. .................. 385/51 |
| 5,367,588 A | 11/1994 | Hill et al. |
| 5,393,371 A * | 2/1995 | Chang et al. ............... 156/629 |
| 5,726,744 A | 3/1998 | Ferdinand et al. |
| 6,056,436 A * | 5/2000 | Sirkis et al. .................. 356/32 |
| 6,137,565 A | 10/2000 | Ecke et al. |

FOREIGN PATENT DOCUMENTS

| | | |
|---|---|---|
| DE | 3142392 | 7/1989 |
| EP | 0267381 | 5/1988 |
| EP | 0753130 | 1/1997 |
| EP | 0892244 | 1/1999 |

OTHER PUBLICATIONS

A. D. Kersey; "Monomode Fibre Polarisation Scrambler"; Electronics Letters, vol. 23, No. 12, 1987, pp 634–636.
Kim et al.; "A Model of Embedded Fiber Optic Fabry–Perot Temperature and Strain Sensors"; Journal of Composite Materials, vol. 27, No. 17, 1993, pp. 1618 to 1635.
Trutzel et al.; "Smart Sensing of Aviation Structures with Fiber–optic Bragg Grating Sensors"; SPIE's 7th Annual Symposium on Smart Structures and Material; Conference on Sensory Phenomena and Measurement Instrumentation for Smart Structures and Materials; Mar. 5–9, 2000, Newport Beach, CA, USA; pp. 1, 2, 10.
"Polarization–mode properties of elliptical–core fibers and stress–induced birefringent fibers", by Nori Shibata et al.; J. Opt. Soc. Am./vol. 73, No. 12, Dec., 1983; pp. 1792 to 1798.

* cited by examiner

Primary Examiner—Daniel St. Cyr
(74) Attorney, Agent, or Firm—W. F. Fasse; W. G. Fasse

(57) ABSTRACT

In a sensor arrangement for sensing temperature and strain, an optical fiber with a Bragg grating therein is arranged on a substrate and embedded in a cover layer. The fiber is initially adhered onto an adhesive carrier, which then positions and applies the fiber onto the substrate. The fiber is point-wise fixed onto the substrate by a binder applied through holes in the adhesive carrier. Next, the carrier is stripped off to leave the fiber on the substrate. A cover layer is applied over the fiber and the substrate. Temperature and strain variations are transmitted from the cover layer into the fiber as non-circularly-symmetrical strains. The strain and temperature can be independently determined using this single sensor, by feeding quasi-depolarized light into the fiber and measuring the overlapping birefringent reflections from the Bragg grating. The full width at half maximum value indicates the temperature, while the Bragg wavelengths indicate the strain and the temperature.

38 Claims, 1 Drawing Sheet

METHOD AND SENSOR ARRANGEMENT FOR MEASURING TEMPERATURE AND STRAIN USING AN OPTICAL FIBER EMBEDDED IN A COVER LAYER ON A SUBSTRATE

PRIORITY CLAIM

This application is based on and claims the priority under 35 U.S.C. §119 of German Patent Application 100 04 384.4, filed on Feb. 2, 2000, the entire disclosure of which is incorporated herein by reference.

FIELD OF THE INVENTION

The invention relates to an arrangement and a method for detecting and measuring strain and temperature and variations thereof, of a cover layer applied on a substrate, as well as to a method of making such a sensor arrangement. The sensor arrangement uses only a single sensor for separately determining the strain and the temperature and the variations thereof, of certain portions of surface coating layers, and achieves an application of optical sensors that is protected from outside environmental influences by being integrated into the surface coating layer.

BACKGROUND INFORMATION

It is becoming increasingly important to monitor, observe, control, and regulate various structural characteristics in the fields of conventional transport systems for air travel and space travel, and also in the field of motor vehicle construction. Examples of the above include: systems for determining the load realities, so-called load monitoring or load progression monitoring systems, systems for the early detection of structural damage (so-called health monitoring), systems for predictive maintenance requirements and maintenance support, for example at inaccessible locations or known critical structural locations of vehicles and equipment, and in general various "adaptive systems", among which the adaptive wing, the adaptive rotor, the adaptive pantograph, the adaptive landing gear, and the adaptive airbag are already known in the art.

In various ways, these systems contribute to satisfying the needs of the customer who has purchased the vehicle or other equipment. For example, in the case of a load progression monitoring system, the consumed operating life and the remaining operating life can be determined from the actual loads to which the vehicle or equipment has been subjected. Thereby, it becomes possible to aircraft, if the actually flown collective or total load is below the nominal collective load at which maintenance or an overhaul or taking the aircraft out of service would be required. On the other hand, such a system provides added safety, for example when the actual collective load is greater than the nominal allowable collective load, whereupon the duration of utilization would be shortened. In view of this, such a monitoring system gives an airline or other operator of aircraft the possibility of an individualized fleet management and achieves a reduction of the operating costs and particularly the inspection, maintenance and service costs.

When an aircraft, or generally any vehicle, approaches the end of its useful operating life, the effort and expense of inspection and upkeep become significantly increased. In this case the next situation arises, whereby the inspection and the like can be automated, whereby the effort and expense thereof can be reduced. Components that were originally designed and manufactured in an error-free or defect-free manner, can now be operated in a fault tolerant manner without any safety losses or limitations, which in turn will lead to an increase of the useful operating life and therewith a decrease in costs.

Furthermore, due to their own specialized adaptive capabilities, adaptive systems predominantly contribute to increases or improvements of various flight characteristics (or driving characteristics in the case of a general vehicle). Depending on the concrete application, such improvements can lead to a reduction of fuel consumption, a reduction of noise generation, an increase in speed of travel as well as safety of travel, and the like.

It is common to all of these systems that they require a very robust and reliable sensor arrangement, which ensures maximum performance with minimum hardware, effort, complexity, and expense. A pertinent quantity or parameter that can be technically measured to provide required information in such systems is especially the strain of a component or material. Conventionally, such strain is especially measured by electrical strain gages such as foil strain gages of present day technology. Alternatively, strain may be measured with various types of piezoelectric or fiber optic sensor arrangements.

Furthermore, various different concepts are known in the art, whereby optical fibers integrated into a component can be used for measuring the strain and the temperature thereof. In this context, the person of ordinary skill in the art makes use of the well known relationship or equation defining the propagation constant or coefficient $\beta$ of a light wave in an optical fiber, namely: $\beta = *L$, wherein n is the refractive index of the light wave, i.e. the so-called modal index, and L is the length or measuring length of the fiber. Nearly all presently known measuring concepts for measuring strain and temperature are based on the recognition that "n" and "L" in the above equation are varied as a result of strain and temperature variations. This fact also underlies the basic problem of all known temperature and strain measurements using fiber optic sensors, for all types of structural sensor arrangements, namely that the strain and the temperature have a basic and fundamental influence on the values or parameters that can be determined using available measuring technology. Thus, it is difficult or impossible to separately determine the temperature and the strain, because it is difficult or impossible to separate the influences that the temperature has on the strain, and the combined influences that the temperature and the strain both have on the measured parameters.

Published European Patent Specification EP 0,753,130 B1 discloses a system including a fiber optic Bragg grating sensor (FBGS) integrated into the structure of a fiber-reinforced composite material. A separate determination of strain and temperature is possible by means of the two polarization Bragg resonances, which arise because the optical fiber integrated into the structure becomes doubly refractive, i.e. birefringent, whereby the birefringence itself is temperature dependent. According to this reference, the temperature dependent birefringence effect is so strongly or sharply developed, that one obtains two reflection peaks from the Bragg grating. The spacing between the reflection peaks, i.e. the difference between the Bragg wavelengths of the polarization Bragg resonances, is then used as a measure for the temperature, and the Bragg wavelength of each respective peak is used as a measure for the strain and the temperature. Based on this information, a computer-supported calculation and determination of strain and temperature would be possible.

The above mentioned sensor system, however, suffers the disadvantage that it apparently only applies to fiber optic Bragg grating sensors (FBGS) integrated directly into fiber reinforced composite structural components. Thus, the sensor system must be "built in" to the structural component as it is being fabricated. Also, the optical fiber must be ideally oriented perpendicular to the material fibers of neighboring layers. This fact has significant negative effects on the mechanical characterizing values of the structure under some circumstances, and on the effort and expense of fabrication thereof, and will not be practically acceptable to a person of ordinary skill in the art.

German Patent DE 31 42 392 C2 discloses an arrangement for a rip or crack sensor as well as an embodiment for practically realizing such an arrangement. This arrangement uses optical fibers that are integrated into a "painted-on" coating layer on the surface of a substrate. This German Patent Document discloses the substrate-localized application of non-birefringent fibers on the substrate, but does not suggest the use of a fiber-optic Bragg grating, because the disclosed arrangement simply aims to detect cracks of a surface coating layer by means of the irreversible breaking or disruption of the fiber.

In practically carrying out the arrangement of the above mentioned German Patent, one first fixes the individual fiber close to a hole on a film-like or foil-like carrier. This carrier, with the fiber or fibers adhesively secured thereon, is then arranged on a substrate surface on which the fibers are positioned before they are embedded in the "painted-on" coating layer that is to be monitored for the development of cracks or the like. However, due to questionable accuracy of the location and fixing of the fiber, which is to be point-wise exactly fixed on the substrate in the adhesion process using the paint or paint-on coating, it seems impossible to avoid an adhesion of the adhesive film onto the substrate while fixing the fibers. In this context, pulling-off the foil without leaving residual adhesive on the substrate can probably not be achieved. It also seems that the apparatus that is used as an auxiliary aid for fixing the fibers on the perforated film or foil, is too complicated and thus subject to malfunction or breakdown.

SUMMARY OF THE INVENTION

In view of the above, it is an object of the invention to provide an arrangement for detecting and measuring strain and temperature and their variations of a cover layer applied on a substrate, as well as a method of making such an arrangement. It is a further object of the invention to provide such an arrangement and method in which a fiber optic sensor is reliably applied onto a structure while being protected from environmental influences. The present arrangement shall be able to determine the structural strain or expansion and the structural temperature (i.e. the surface temperature) of the applied cover layer, without any special efforts or instructions. Particularly, the present arrangement shall make it possible to measure both the axial strain and the temperature of certain prescribed surface area sections using only a single sensor. The inventive sensor arrangement shall be easily applied onto a surface of essentially any structural component or material as the substrate, without requiring integration into the structure itself. The invention further aims to avoid or overcome the disadvantages of the prior art, and to achieve additional advantages, as apparent from the present specification.

The above objects have been achieved according to the invention in a sensor arrangement for detecting strain and temperature of a cover layer applied on a substrate, wherein the arrangement comprises a substrate, an optical sensor that is positioned on the substrate, and a cover layer applied on the substrate and the optical sensor as well. The optical sensor comprises at least one light conducting fiber or optical fiber including a fiber core surrounded by a fiber cladding, and a Bragg grating that is irradiated or etched into the fiber in a defined section thereof. The optical fiber is either completely or at least partially embedded in and surrounded by the cover layer, whereby a force-transmitting connection exists between the cover layer, the surface of the substrate, and the optical fiber. The optical fiber is preferably directly lying in contact on the surface of the substrate. Non-circularly-symmetrical thermo-mechanical strains are induced in the fiber cladding and in the fiber core of the optical fiber due to stresses or forces that are transmitted into the optical fiber from the cover layer. As a result of these strains, the optical fiber has become birefringent.

The above described arrangement is fabricated according to the invention, by a process as follows. An adhesive carrier having a plurality of holes therein and having one adhesive surface is provided. An optical fiber is adhesively secured onto the adhesive surface of the adhesive carrier, without exceeding the allowable radius of curvature of the optical fiber, while the fiber is positioned along the row or pattern of the various hole positions of the holes in the adhesive carrier, whereby the optical fiber is aligned to extend essentially over the center of each hole, and then is adhesively fixed on the adhesive carrier in this condition. The optical fiber that has been fixed in this manner is then positioned on the surface of the substrate, and thereafter a binder material is applied to penetrate through the holes of the adhesive carrier onto the surface of the substrate so as to point-wise adhere or fix the optical fiber onto the surface of the substrate. This applied binder material is then allowed to cure, and thereafter the adhesive carrier is peeled off of the optical fiber. Then, the adhesively secured or tacked optical fiber is completely or at least partially surrounded and enclosed by a further coating medium that is surfacially applied on the surface of the substrate and on the optical fiber, so that the optical fiber becomes embedded in this applied layer of the coating medium. After this coating medium layer is cured, the optical fiber has thereby been finally secured on the surface of the substrate.

The above described arrangement is used in a method according to the invention for determining the strain and the temperature of the cover layer applied on the substrate. When a temperature dependent mechanical strain arises in the cover layer, the force transmitting connection between the cover layer and the optical fiber embedded therein transmits corresponding forces into the optical fiber and thereby induces a non-circularly-symmetrical strain in the fiber cladding and the fiber core of the optical fiber, especially in the section of the fiber in which a Bragg grating has been formed. As a result of this induced strain, the optical fiber becomes birefringent, and the resulting birefringence causes a spreading or broadening of the spectrum of the Bragg grating. By measuring the width of the spectrum of the Bragg grating, the resultant width, such as the full width at half maximum intensity (FWHM), is used as a measure of the temperature. In other words, the temperature of the coating layer can be determined from this width measure of the spectrum.

Furthermore, the sensor is preferably actuated by conducting a quasi-depolarized light into the sensor through the optical fiber. As a result of the above mentioned birefringence, which is not a very strong birefringence, the quasi-depolarized light in the Bragg grating sensor causes a total spectrum that is formed from the respective spectra of the two polarization Bragg resonances, whereby the form of this spectrum will vary preferably only as a function of temperature. The resulting full width at half maximum value is measured while providing the quasi-depolarized light as an input, and then the Bragg wavelength of this spectrum is determined as the arithmetic mean of the two individual polarization Bragg resonances. Namely, the Bragg wavelength for the spectrum resulting from the quasi-depolarized light is taken as one half of the sum of the Bragg wavelengths of the individual polarization Bragg resonances. This Bragg wavelength is used as a measure of the axial strain of the sensor as well as the temperature. Thereby, the temperature can be determined from the full width at half maximum value, and the axial strain can be determined in connection therewith from the Bragg wavelength.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
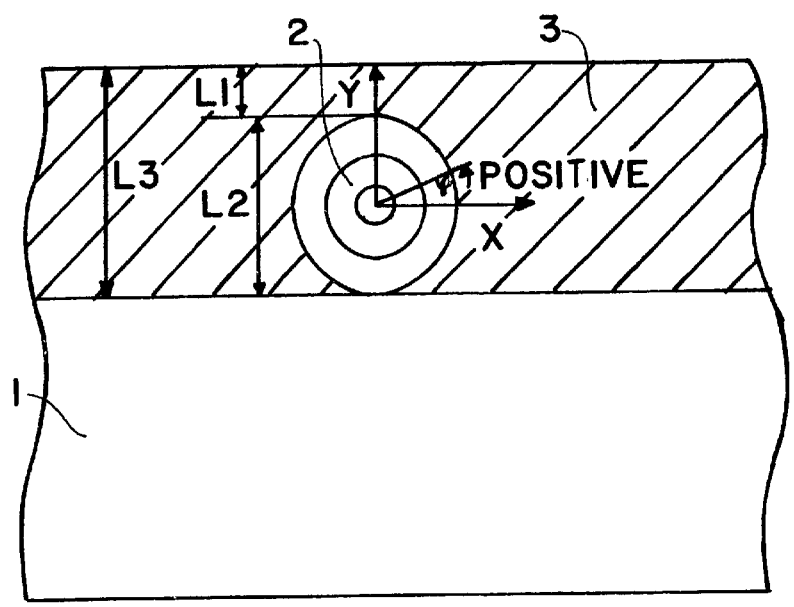
FIG. 1 is a schematic sectional view of a sensor arrangement for detecting strain and temperature and their variations in a cover layer applied on a substrate according to the invention.

As schematically shown in FIG. 1, an example embodiment of the sensor arrangement according to the invention comprises a substrate 1 made of metal, synthetic plastic, or ceramic, such as aluminum, a carbon fiber-reinforced composite, a graphite fiber reinforced composite, a glass-fiber reinforced composite, Kevlar, or a Kevlar based material such as a Kevlar based composite material. The substrate 1 may be essentially any pre-existing structural component of which the surface strain and temperature is to be measured and monitored. The sensor arrangement further comprises at least one optical fiber 2 applied onto the surface of the substrate 1. The optical fiber 2 may be referred to as an optical fiber, a light conductor fiber, a light conductor, or an optical wave guide. The arrangement further comprises a cover layer 3 that is applied onto the substrate 1 and covering the optical fiber 2 as a protective surface coating. The cover layer 3 may be a lacquer, paint, enamel, varnish, resin or any conventionally known "paint-on" coating.

The cover layer 3 may completely or partially surround and enclose the at least one optical fiber 1. A complete covering and surrounding of the optical fiber 1 is achieved if the relationship: thickness of the cover layer L3 is greater than the optical fiber outer diameter L2 (L3>L2) is maintained, and a difference spacing L1 is provided between the cover layer surface and the optical fiber 2 in a direction perpendicular to the surface of the substrate 1. On the other hand, a partial covering or surrounding of the optical fiber 2 is achieved if the relationship: thickness of the cover layer L3 is less than the optical fiber outer diameter L2 (i.e. L3<L2) is maintained. In both of these cases, the optical fiber 2 will be embedded in the cover layer 3. The embodiment illustrated in FIG. 1 relates to the optical fiber 2 being completely surrounded or enclosed by the cover layer 3.

The fibers that can be used as the optical fiber 2 include all sorts of conventionally known glass fibers which are typically used in the telecommunications field and are generally given the short name "telecomm fibers". The optical fiber 2 may alternatively be selected from any available special forms or configurations of light conductor fibers, such as various types of polarization-maintaining fibers (so-called Panda-type, elliptical core fibers, etc.) as well as double core and multiple core fibers, or so-called side-hole fibers. These special forms of fibers can be advantageous in order to increase or amplify the measurement effect that is to be achieved according to the method of the invention.

The arrangement according to FIG. 1 uses a standard telecomm fiber which comprises a fiber core, a fiber cladding, and may optionally additionally comprise a fiber jacket or sheath. The optical sensor may be formed by the entire coating-embedded optical fiber 2 arranged on the surface of the substrate 1, or alternatively only a defined section or portion of this optical fiber 2. It is further possible to sensitize this defined section or portion of the optical fiber 2 in a suitable manner, in order to achieve a higher measuring sensitivity with respect to the desired measured values, i.e. strain and temperature, or in order to simplify the measuring technology. The sensitizing of this fiber portion may, for example, be achieved by introducing reflecting locations into this fiber section. A particularly advantageous method of introducing such reflecting locations into the fiber is by means of generally known irradiating (e.g. "burning in") or etching of a fiber optic Bragg grating into the respective portion of the optic fiber.

Further regarding the arrangement shown in FIG. 1, the optical sensor is particularly realized with at least one optical fiber 2 which is positioned lying directly in contact on the surface of the substrate 1 and is embedded in the cover layer 3 as described above, whereby the optical fiber 2 is either entirely or at least partially surrounded by the cover layer. Rather than lying directly on the surface of the substrate 1, the optical fiber 2 may be guided and held at a spacing distance above the substrate 1. In any event, the optical fiber 2 is held adherently on the surface of the substrate 1 and within the cover layer 3 consisting of a lacquer or a resin or the like, at least over a section or sections of the optical fiber 2.

As a further alternative embodiment, the fiber optic sensor can be realized or embodied with a plurality of optical fibers 2 applied on the surface of the substrate 1. In this context, one of the optical fibers is a main optical fiber, while plural other auxiliary or side fibers are connected to the main fiber on the surface of the substrate 1. The interconnection of the main fiber and the side fibers can be a branched arrangement or a network arrangement, but in any event the several optical fibers form an optical fiber structure such as a network or branching pattern, that spreads out to effectively cover the surface of the substrate 1. In this manner, it becomes possible to achieve a local measurement of the strain and the surface temperature of the cover layer 3 applied onto the substrate 1, at plural locations substantially covering the surface of the cover layer.

Next, the method of mounting or integrating the optical sensor onto the surface of the substrate, and the overall fabrication process for fabricating the above described arrangement according to FIG. 1, will be described in greater detail. In the integration or mounting of the optical fiber or fibers 2 to be embedded in the cover layer 3 applied onto the substrate 1, the most important factor is that a force-transmitting connection must be reproducibly and consistently achieved through the entire integration area between the surface of the substrate 1 and the optical fiber or fibers 2. It should further be understood that the substrate 1 can be any structural component or structural surface of which the strain and the temperature is to be measured. For this reason, it is important that the application or mounting of the optical fiber 2 is carried out very carefully. Only with such a force-transmitting connection, can the strain of the underlying structure be represented by the strain of the cover layer 3 which in turn is unambiguously transmitted into the optical fiber 2 acting as a sensor. On the other hand, the required effort and cost of applying the optical fiber 2 should be as low as possible and should especially be automatically or semi-automatically carried out by machines or appropriate tools. These requirements are achieved by the application technique discussed below. Preparatory measures of the integration process are embodied or carried out in a so-called "linear application", and a so-called "surfacial application". This preparation is followed by mounting or applying the prepared optical fiber onto the surface of the substrate. As a final step, appropriate light source and light analyzer devices are optically connected to the optical fiber in any conventionally known manner and arrangement, for carrying out the optical signal analysis according to the invention as described below.

The following steps are carried out in the linear application. It is generally difficult to handle the optical fibers, due to their very small diameter and high flexibility, unless additional stabilizing measures are provided. Therefore, it is advantageous to use an adhesive carrier in the form of an adhesive strip, which is first provided with holes periodically along its length-wise extension direction. The suitable adhesive strip having plural stamped-out holes and one side thereof provided with an adhesive, is obtained as a previously prepared supplied part. In a first step of the present process, the optical fiber 2 is applied onto the adhesive side of the adhesive strip so that the fiber 2 is fixed along the centerline or middle of the strip, over the row of holes thereof. In this preparation step, an optical fiber fixing device is used in which an optical fiber is unrolled from an optical fiber supply spool, and an adhesive strip is unrolled from an adhesive strip supply spool. The fiber and the adhesive strip are then guided together in a defined manner by a suitable guide apparatus, whereby the optical fiber is positioned and fixed as mentioned above along the centerline along the adhesive strip in a continuous manner. Thereafter, i.e. downstream from this guide apparatus, the joined optical fiber and adhesive strip are rolled up on a receiver spool or take-off spool. From there, the optical fiber adhered onto the adhesive strip will next be positioned on a substrate 1, as will be described below.

It should be further understood that an adhesive strip with plural parallel rows of holes can be used instead of the above mentioned adhesive strip with a single centered row of holes. In any event, such an adhesive strip with plural parallel rows of holes would similarly be pulled off of an adhesive strip supply spool in the manner described above. It is then further possible to carry out a defined guiding-together of plural optical fibers that are separately or individually rolled-up on separate optical fiber supply spools, such that the optical fibers are then arranged as individual optical fibers 2 respectively along the middle of the hole diameters of the holes of the associated respective parallel rows of holes on the adhesive side of the adhesive strip, so that the several optical fibers are fixed on the adhesive strip in this manner, as described above. The adhesive strip, of course, has a width that is suitable for receiving the plural optical fibers 2 adhesively secured thereon, and the receiver spool or take-off spool on which this strip with the optical fibers is then rolled-up also has a suitable dimension in this context. Subsequently, such an adhesive strip with several parallel optical fibers thereon will be used for positioning parallel adhesively secured optical fibers onto the surface of the substrate, as described below.

It should be noted that the adhesive side of the adhesive strip has a properly defined adhesive force or adhesion characteristic, so that upon removing the adhesive strip from the optical fibers and also from the surface of the substrate 1, no rest pieces or residue of the adhesive will remain on the surface of the substrate or on the optical fibers. It is also important that the adhesive properly releases from the fibers and does not pull the fibers up away from the surface of the substrate.

While the above described linear application utilized an elongated adhesive strip, a surfacial application can use an adhesive carrier in the form of a surfacially extending sheet of adhesive film, which has an adhesive on one side thereof. One or more rows or chain patterns of periodically stamped holes are provided in the adhesive film for prescribing or guiding the later pattern of the optical fiber or fibers 2. The geometrical chain progression or pattern of these holes is substantially unlimited as desired. It is only important that the lines or patterns of guide holes do not define radii of curvature that are smaller than the minimum radius of curvature of the optical fiber 2 that will be used. These holes may be formed either manually or using an automated stamp cutting machine that is computer controlled so as to prescribe various hole positions or patterns. The application of the optical fiber or fibers 2 onto the adhesive side of the perforated adhesive film is carried out either manually or similarly using a computer controlled automatic machine or robot, which guides one or more optical fibers from one or more optical fiber supply spools using a controlled guide apparatus so as to guide each respective optical fiber into adherent contact on the adhesive film along the respective line or chain pattern defined by the corresponding row of holes. The adhesive force characteristics of the adhesive side of such an adhesive film correspond to those described above for the adhesive strip used in the linear application technique.

Once the above described preparatory measures of the integration process have been completed, thereafter the outer surface application of the thusly prepared optical fibers (and adhesive strip or film) onto the substrate can be carried out. To achieve this, the optical fiber or fibers 2 that have been adhered on the adhesive strip or film as described above, are first pulled under tension from the respective take-off spool or receiver spool on which they were rolled-up. Then the optical fiber or fibers held by the adhesive strip or film are positioned on the surface of the substrate 1, which has preferably previously been cleaned to provide a good adherent surface. Thereby, the optical fiber or fibers are pressed against the surface of the substrate 1, and a binder material such as a special primer paint is applied from the non-adhesive back surface of the adhesive carrier, so that the binder material penetrates through the holes of the adhesive carrier so as to point-wise adhere or tack the optical fiber or fibers onto the surface of the substrate 1. This binder material is then cured, and thereafter the adhesive carrier is pulled and peeled off of the optical fibers 2, while leaving the optical fibers 2 properly positioned on the surface of the substrate 1. Then a further cover layer material, i.e. a second paint or lacquer application, is applied over the entire surface of the optical fibers and the underlying substrate so as to finally secure the optical fibers 2 onto the surface of the substrate 1, while embedding the fibers 2 in the cover layer 3. If necessary or desired, it is possible to apply further cover Layers 3, so that the finished cover layer includes multiple overlaid sub-layers. The cover layer is cured, dried or hardened to finally secure the optical fibers.

When carrying out the above described measures, particular attention must be paid to the adhesive force or adhesion characteristics of the adhesive carrier. On the one hand, the adhesive force provided by the adhesive side of the adhesive carrier must be large enough to relatively securely hold the optical fiber or fibers 2 in the proper positions along the rows or lines of holes. On the other hand, the adhesive force must be small or low enough so that when the adhesive carrier is stripped off of the optical fiber or fibers 2 and the underlying surface of the substrate 1, so as to release and separate from the optical fiber or fibers 2, which shall remain secured to the surface of the substrate 1 by the point-wise applied binder material such as a primer paint. In this context, the surface of the substrate does not have to be a flat planar surface. However, any curvature of the carrier surface may not have a smaller or tighter radius of curvature than the minimum radius of curvature that is acceptable for the respective optical fiber.

The discussion will now turn to a method for detecting the strain and temperature, and their variations, of the cover layer 3 applied on the substrate 1, whereby the above described arrangement of an optical sensor positioned on the substrate 1 is used. As has been mentioned above in the introductory portion of this application, it is generally known to use optical fibers to measure strain and temperature, particularly by making use of the known relation $\beta=n*L$, wherein $\beta$ is the propagation or spreading constant of a light wave in the optical fiber, n is the refractive index and L is the length of the fiber. Based on that concept as a starting point, the invention further proceeds with the thought that n and L will be varied by strain and temperature variations. For the sake of a simplified discussion, if one assumes that the electromagnetic wave propagating in a single mode fiber can be described as a plane wave, which is a good approximation for weakly conducting fibers, whereby this plane wave will propagate in the Z-direction with reference to the coordinate system shown in FIG. 1, then the refractive index will be the same, i.e. identical, for each oscillation direction in the X-Y direction or plane of the wave (with reference to FIG. 1) as long as no double refraction or birefringence takes place in the fiber.

The inventive method for detecting strain and temperature variations of a cover layer 3 applied on a substrate 1, to be described below, makes use of and further develops the above described general concept. In order to be able to separately determine the temperature and the strain by using the above described optical fiber sensor arrangement, the first basic requirement is a suitable selection of materials for the substrate 1, for the optical fiber 2 and for the cover layer 3, so that a temperature dependent birefringence will be caused in the optical fiber 2. This can be achieved if the cover material of the cover layer 3 transmits and induces into the fiber core and the fiber cladding of the optical fiber 2, mechanical tensions that are temperature dependent and not circularly symmetrical. This can be achieved by fabricating the sensor arrangement in the above described method, especially when the optical fiber 2 is substantially directly lying in contact on the surface of the substrate 1, and especially when the material of the substrate 1 is significantly different from the material of the fiber, and the material of the cover layer 3 is significantly different from the material of the fiber and the material of the substrate 1.

The optical fiber 2 is said to be only "substantially" directly in contact with the surface of the substrate 1, because it can occur that the adhesive or binder material or primer paint, which is applied through the holes of the adhesive carrier to achieve the point-wise fixing of the optical fiber 2 onto the substrate 1, will flow underneath or between the optical fiber 2 and the surface of the substrate 1 to some extent and thereby lift the optical fiber 2 slightly away from the surface of the substrate 1.

In any event, due to the above mentioned transmitting of non-circularly-symmetrical strains into the optical fiber, this means that the electromagnetic wave of the light coupled into the fiber will "see" a different refractive index depending on the particular oscillation direction in the X-Y plane of the electromagnetic wave. This difference of the refractive index effectively represents a birefringence in the optical sensor, and can be measured basically as a spreading or overlapped doubling of the resulting spectrum, using known interferometric or polarimetric methods.

The relationships become especially simple if a Bragg grating is provided as a sensor element in the corresponding fiber section of the optical fiber 2. In this context, the Bragg grating develops or generates a resonance about the so-called Bragg wavelength $\lambda_B$ in a non-birefringent fiber. This resonance is represented by the functional equation or relationship $\lambda_B=2*n*\Lambda$, whereby n is the middle effective refractive index and $\Lambda$ is the grating period.

Insofar as the fiber now becomes birefringent, a different Bragg wavelength is obtained respectively for each oscillation direction of the wave. This effect is discussed in the above mentioned published European Patent Specification EP 0,753,130 B1 for the special case of a fiber optic Bragg grating sensor integrated into a fiber-reinforced composite structure.

For a better understanding of the process for detecting strains and temperature variations of the cover layer applied onto a substrate, the following points regarding the strain and temperature sensitivity of Bragg grating sensors should be taken into account. Fiber optic Bragg grating sensors (FBGSs) are characterized by their period, by the amplitude of the permanent periodic or also quasi-periodic refractive index modulations, and by the length of the refractive index modulation (i.e. the grating length). By establishing the fixed grating period while fabricating the sensor, the spectral range of the sensor is thereby also fixedly determined, i.e. this is the spectral range in which the sensor can reflect the light being guided in the optical fiber. In this context, the amplitude of the refractive index modulation and the grating length determine the concrete characteristics of the grating spectrum, among which the maximum reflectivity and the full width at half maximum value (FWHM) of the spectrum are particularly to be mentioned.

The wavelength of the maximum is referred to as the Bragg wave-length $\lambda_B$ and is determined from the product of the grating period $\Lambda_O$ and the middle effective refractive index in the grating range $n_0$, whereby the following equation applies:

$$\lambda_{BO}=2*n_O*\Lambda_O \qquad \text{Equation (1)}$$

Both magnitudes can be polarization dependent, whereby the Bragg wavelength also becomes polarization dependent. Thus, the Bragg wavelength will be represented as $\lambda_{Bp/q}$, whereby p or q represent the two possible polarization axes of the optical fiber. The index "O" refers to the unstrained condition of the sensor at a fixed or constant temperature.

A fiber-optic Bragg grating (FBG) can be used as a strain and/or temperature sensor, because both the refractive index $n_O$ and the grating period $\Lambda_O$ are functions of the strain tensor and the temperature, and thereby according to the above Equation (1) also the Bragg wavelength $\lambda_B$ will vary insofar as external forces act on the Bragg grating. As a first approximation, one will then begin from the following equation:

$$\Delta\lambda_B/\lambda_{BO} = \Delta\Lambda(\epsilon_i)/\Lambda_O + \Delta n(\epsilon_i, \Delta T)/n_O \text{ with } i=1,2,\ldots 6. \quad \text{Equation (2)}$$

The symbol "$\epsilon_i$" represents six strain components of mechanical and thermal strain in a reduced written form, and the symbol "$\Delta T$" represents a temperature variation. The present analysis will apply a model of the variation of the geometrical and optical characteristics of the sensor as a function of the strain components and of the temperature according to Kim et al., which is generally known to persons of ordinary skill in the art. In this context, the fiber axis will be oriented to extend in the $x_1$ direction of a right angled coordinate system. For an optically isotropic sensor, the variations will result in:

$$\Delta\Lambda(\epsilon_i) = \Lambda_O * \epsilon_i$$

and $$\Delta n_{p/q}(\epsilon i, \Delta T) = -n_O^{3/2} * \{p_{12}*\epsilon_1 + [(p_{11}+p_{12})*\frac{1}{2}]*(\epsilon_2+\epsilon_3) \pm [(p_{11}-p_{12})*\frac{1}{2}]*\gamma_{max} - [2/n_O^3 * dn_O/dT + (2*p_{12}+p_{11})*\alpha]*\Delta T\} \quad \text{Equation (3)}$$

The symbols "$p_{11} + p_{12}$" are the photoelastic constants of the optical fiber, "$\epsilon$" represents the linear thermal expansion or strain coefficient of the optical fiber, and "$\gamma_{max}$" is defined as the maximum shear strain in the plane perpendicular or normal to the fiber axis. In this context, the following equation holds:

$$\gamma_{max} = [(\epsilon_2 - \epsilon_3)^2 + \epsilon_4^2]^{1/2} \quad \text{Equation (4)}$$

For a uniaxial thermomechanical tension in the direction of the fiber axis, the following relations are valid: $\epsilon_1 \neq 0$; $\epsilon_2 = \epsilon_3 = -v^* \epsilon_1 + (1+v)*\alpha*\Delta T$, and $\epsilon_4 = \epsilon_5 = \epsilon_6 = 0$, whereby $v$ is the Poisson number of the optical fiber ($\epsilon = 0.17$). Then, based on the above equations 2, 3 and 4, the following holds true for the shift of the Bragg wavelength as a function of the axial strain and the temperature variation:

$$\Delta\lambda_B/\Delta\lambda_{BO} = [1 - p^{eff}]*\epsilon_1 + [\alpha*p^{eff} + 1/n_0*dn/dT]*\Delta T \text{ and}$$

$$p^{eff} = \frac{1}{2}n_0^{2*}[p_{12} - v^*(P_{11}+p_{12})] \quad \text{Equation (5)}$$

with the so-called effective photoelastic constant $p^{eff}$. Generally, the above Equation 5 is used for calibrating the fiber optic Bragg grating sensor (FBGS). It can be recognized, that a linear relationship exists between the relative Bragg wave-length shifting and the axial strain. The value for the effective photoelastic constant, for a constant temperature, has been determined to be $p^{eff} = 0.19$ to 0.23 for a series of different FBGSs, depending on the particular concrete fiber doping of the particular FBGS. Within the scope of the introduced measuring accuracy, no temperature dependence of these values was discovered over a temperature range from $-50°$ C. to $100°$ C.

The thermal sensitivity of the sensors similarly depends on the concrete fiber doping, and can additionally be influenced by the fiber coating. In a good approximation, for Bragg wavelengths about 1.53 $\mu$m, one obtains a shift of the Bragg wavelength of 1.2 pm/($\mu$m/m) with respect to the strain, and approximately 10 pm/(K) with respect to the temperature.

From the above Equation 5, the basic problem of the strain measurement with an FBGS becomes clear. Namely, the primary measured value, i.e. the Bragg wavelength, shifts as a function of strain and as a function of temperature. Therefore, one cannot distinguish or differentiate between these two effects.

If one rewrites the above Equation (5) in the form:

$$\Delta\lambda_B = K_\epsilon * \epsilon + K_T * \Delta T \quad \text{Equation (6)}$$

with "$K_\epsilon$" being the sensitivity factor for strain, and "$K_T$" being the sensitivity factor for temperature, then this problem could be solved, if for example a second Bragg wavelength with other sensitivity factors was at hand.

The measurement of the two Bragg wavelengths will now provide the desired values to be obtained, according to the following relation or equation:

$$\begin{pmatrix} \Delta\lambda_{B1} \\ \Delta\lambda_{B2} \end{pmatrix} = \begin{pmatrix} K_{\epsilon 1} & K_{T1} \\ K_{\epsilon 2} & K_{T2} \end{pmatrix} * \begin{pmatrix} \epsilon \\ \Delta T \end{pmatrix} \quad \text{Equation (7)}$$

(with inversion of the sensitivity matrix).

Now the next conceptual step is to make the form of the spectrum dependent on one of the two values, either axial strain or temperature, in order to thereby calculate-out or exclude the effect of this value out of the Bragg wavelength shift. In this context, the full width at half maximum value (FWHM) of the spectrum represents a technically simple measure that can be detected to represent the "form" of the spectrum.

Now the above concepts will be discussed in the concrete process for detecting the strains and temperatures, and their variations, in the cover layer 3 applied onto the substrate 1, using a Bragg grating that has been irradiated into the optical fiber 2 as described above, whereby a double refraction or birefringence of the light coupled into the optical fiber 2 has been induced in the optical fiber 2, and whereby this birefringence is temperature dependent and is not very strong. Thus, thereby the spectra are not entirely separated or split apart, but rather they over-lap each other, because a splitting of the Bragg reflection into two independent peaks is particularly not achieved.

In this context of an overlapping of the two polarization Bragg resonances, which are generally called spectra in the following discussion, these two spectra may only be both simultaneously measured if the light used for driving or activating the sensor contains the corresponding polarization components which lead to a reflection in the respective spectrum. This can be achieved by the preferred use of "quasi-depolarized light", which is known to persons of ordinary skill in the art. It is further known in the art how to generate such quasi-depolarized light. More particularly in this context, a single spectrum is generated or formed from the two individual overlapping spectra, whereby the resultant single spectrum can be considered as a mean value or average of the two individual overlapping spectra. If one assumes that the two polarization Bragg resonances respectively have an identical form yet slightly differing Bragg wavelengths $\lambda_{Bp}$ and $\lambda_{Bq}$, then upon actuating the sensor with quasi-depolarized light, a spectrum will be measured of which the Bragg wavelength $\lambda_{Bdepol}$ follows as the arithmetic mean value of the two individual polarization Bragg resonances $\lambda_{Bp}$ and $\lambda_{Bq}$ according to the relationship or equation $\lambda_{Bdepol} = \frac{1}{2}*(\lambda_{Bp} + \lambda_{Bq})$. This is possible so long as the difference between the two polarization Bragg resonances $\lambda_{Bp}$ and $\lambda_{Bq}$ is smaller than the full width at half maximum value of an individual spectrum: $|\lambda_{Bp} - \lambda_{Bq}| < \text{FWHM}_{(overlapping\ spectrum)}$. This relationship or inequality can thus also be seen as a measure or definition of the above mentioned general feature that the birefringence is "not very strong".

Figure 2:
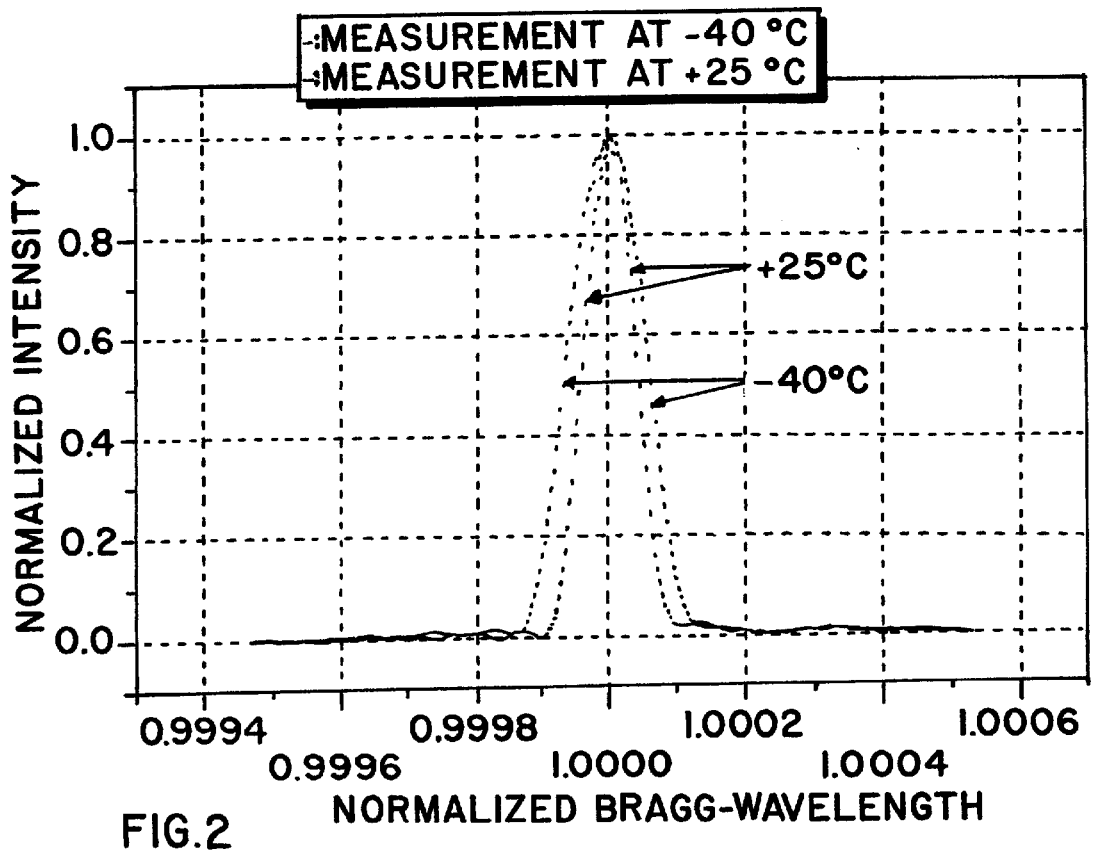
FIG. 2 is a diagram showing the normalized intensity as a function of the normalized Bragg wavelength for a spectrum of a fiber optic Bragg grating sensor integrated in a lacquer surface coating at respective temperatures of −40° C. and +25° C.

According to the above solution, by the manner of the application of the fiber optic Bragg grating sensor, it is achieved that the spectrum measured with quasi-depolarized light is generated from the spectra of the two polarization Bragg resonances as mentioned above, and varies its form preferably only as a function of temperature, whereby this form of the spectrum can advantageously be measured or characterized by means of the full width at half maximum value ($FWHM_{depol}$), for example as shown in FIG. 2. Namely, the Bragg wavelength of this spectrum $\lambda_{Bdepol}$ shifts also as a function of the axial strain of the sensor as well as of the temperature according to the above Equations (5) and (6). However, since the temperature can be determined and factored out by means of the $FWHM_{depol}$, it is possible to calculate a pure axial strain, for example using a computer. Moreover, this separated temperature and strain determination is achieved preferably using only one single sensor.

The above described apparatus and method has the advantage that it can be used on essentially any structural surface, by simply ensuring that the strains induced in the fiber through the cover material are sufficiently large. This can be ensured if the materials are selected so that they have a sufficient difference between the thermal expansion coefficients thereof, and/or the temperature dependence of the modulus of elasticity of the respective materials is sufficiently large.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A sensor arrangement for determining a temperature and a strain, comprising:
   a substrate having a substrate surface;
   an optical sensor arranged directly or indirectly on said substrate surface, wherein said optical sensor comprises at least one optical fiber including a fiber core and a fiber cladding, and a Bragg grating formed in a sensor section of said optical fiber; and
   a cover layer applied onto said substrate and said optical fiber such that said optical fiber is embedded in and at least partially surrounded by said cover layer and secured thereby onto said substrate, and such that a force-transmitting connection is established between said substrate, said cover layer and said optical fiber; and
   wherein said optical sensor is birefringent due to a non-circularly-symmetrical thermomechanical strain that has been transmitted and induced from said cover layer into said optical fiber.

2. The sensor arrangement according to claim 1, wherein said optical fiber is arranged directly in contact on said substrate surface of said substrate.

3. The sensor arrangement according to claim 1, wherein said Bragg grating is irradiated or etched into said sensor section of said optical fiber.

4. The sensor arrangement according to claim 1, wherein said sensor section of said optical fiber is a portion of a length of said optical fiber arranged on said substrate.

5. The sensor arrangement according to claim 1, wherein said sensor section of said optical fiber is an entire length of said optical fiber arranged on said substrate.

6. The sensor arrangement according to claim 1, wherein said Bragg grating comprises reflective locations introduced into said optical fiber.

7. The sensor arrangement according to claim 1, wherein said substrate consists essentially of a metal, a plastic or a ceramic, said optical fiber is a glass fiber, said optical fiber lies in contact with and on said substrate surface of said substrate, said cover layer consists of a coating layer of a resin, a lacquer, a varnish, a paint, a primer, or an enamel which is applied and adheres onto said substrate surface and said optical fiber, and wherein at least a portion of said optical fiber is guided and secured fixedly in said cover layer.

8. The sensor arrangement according to claim 1, wherein said optical fiber is a polarization-maintaining optical fiber of the Panda-type or of which said fiber core is an elliptical core.

9. The sensor arrangement according to claim 1, wherein said optical fiber is a fiber selected from the group consisting of double-core fibers, multi-core fibers, and side-hole fibers.

10. The sensor arrangement according to claim 1, wherein said optical fiber is a monomode fiber supporting only a single mode of light propagation therein.

11. The sensor arrangement according to claim 1, wherein said optical fiber is a multi-mode fiber supporting multiple modes of light propagation therein.

12. The sensor arrangement according to claim 1, wherein said optical fiber is a standard telecomm fiber, that further includes a fiber sheath jacket arranged around said fiber cladding.

13. The sensor arrangement according to claim 1, wherein a thickness of said cover layer measured perpendicular to said substrate surface is greater than an outer diameter of said optical fiber, and said optical fiber is entirely embedded in and covered over by said cover layer.

14. The sensor arrangement according to claim 1, wherein a thickness of said cover layer measured perpendicular to said substrate surface is less than an outer diameter of said optical fiber, and a portion of said optical fiber is not embedded in and not covered by said cover layer but rather protrudes outwardly beyond said cover layer away from said substrate.

15. The sensor arrangement according to claim 1, wherein a thickness of said cover layer measured perpendicular to said substrate surface is equal to an outer diameter of said optical fiber, and said optical fiber is substantially just exactly embedded in said cover layer without an extra thickness of said cover layer covering over a surface of said optical fiber directed away from said substrate.

16. The sensor arrangement according to claim 1, wherein said sensor arrangement includes exactly only one said optical sensor which includes exactly only one said optical fiber that is used to determine both said temperature and said strain.

17. The sensor arrangement according to claim 1, wherein said optical fiber is a main optical fiber, and said optical sensor further comprises at least one additional secondary optical fiber respectively connected to said main optical fiber and forming an optical fiber branched network thereof on said substrate surface.

18. The sensor arrangement according to claim 1, further comprising a source of quasi-depolarized light connected to said optical fiber so as to introduce quasi-depolarized light into said optical fiber.

19. The sensor arrangement according to claim 1, wherein said optical sensor has a degree of birefringence that is only sufficient to form two overlapping Bragg spectra and is not sufficient to form two separate offset Bragg spectrum peaks.

20. A method of using the sensor arrangement according to claim 1 for determining a strain and a temperature, comprising the following steps:
   a) introducing a light into said optical fiber;
   b) transmitting a temperature-variation-induced temperature-dependent strain from said cover layer non-circularly-symmetrically into said optical fiber;
   c) causing a birefringent double refraction of said light with said Bragg grating dependent on and responsive to said strain transmitted into said optical fiber, and thereby spreading a Bragg spectrum of said light refracted from said Bragg grating; and
   d) measuring a spectrum width of said Bragg spectrum and determining a temperature of said coating layer from said spectrum width, or measuring a Bragg wavelength of said Bragg spectrum and determining an axial strain of said optical fiber from at least said Bragg wavelength.

21. The method according to claim 20, wherein said step d) comprises said measuring of said spectrum width and said determining of said temperature.

22. The method according to claim 20, wherein said step d) comprises said measuring of said Bragg wavelength and said determining of said axial strain.

23. The method according to claim 20, wherein said step d) comprises both said measuring of said spectrum width and said determining of said temperature, as well as said measuring of said Bragg wavelength and said determining of said axial strain.

24. The method according to claim 23, wherein said Bragg spectrum is made up of and includes two polarization Bragg resonance spectra respectively caused by said double refraction, said Bragg wavelength is the arithmetic mean of two respective polarization resonance wavelengths respectively of said two polarization Bragg resonance spectra, and said determining of said temperature and said determining of said axial strain comprise evaluating an offset spacing between said two polarization resonance wavelengths as a measure of said temperature, and evaluating said polarization resonance wavelengths as a measure of said strain and of said temperature.

25. The method according to claim 20, wherein said step a) comprises introducing a quasi-depolarized light as said light into said optical fiber.

26. The method according to claim 25, wherein said Bragg spectrum is made up of and includes two polarization Bragg resonance spectra respectively caused by said double refraction, said Bragg wavelength ($\lambda_{Bdepol}$) is determined as the arithmetic mean ($\lambda_{Bdepol} = \frac{1}{2}(\lambda_{Bp} + \lambda_{Bq})$) of two respective polarization resonance wavelengths ($\lambda_{Bp}, \lambda_{Bq}$) of said two polarization Bragg resonance spectra, said spectrum width measured in said step d) is the full width at half maximum value of said Bragg spectrum, and said axial strain (E) is determined by a shifting of said Bragg wavelength according to $\Delta\Lambda_B/\Lambda_{BO} = (1-p^{eff})*\epsilon_1 + (\alpha*p^{eff} + 1/n_0*dn/dT)*\Delta T$ with $p^{eff} = \frac{1}{2}*n_0^2*(p_{12} - \nu*(p_{11}+p_{12}))$ for a photoelastic constant ($p^{eff}$) or the relationship $\Delta\Lambda_B = K_\epsilon*\epsilon + K_T*\Delta T$ with a sensitivity factor for the strain ($K_\epsilon$) and a sensitivity factor for the temperature ($K_T$).

27. The method according to claim 25, wherein said quasi-depolarized light contains respective polarized light components that will respectively form two polarization Bragg resonance spectra that overlap each other to together form said Bragg spectrum.

28. The method according to claim 27, wherein said two polarization Bragg resonance spectra respectively have identical spectra forms but are offset from one another with respective different resonance wavelengths, and wherein said Bragg wavelength is the arithmetic mean of said resonance wavelengths.

29. The method according to claim 28, wherein a difference between said resonance wavelengths is less than the full width at half maximum (FWHM) value of said Bragg spectrum.

30. The method according to claim 20, wherein said strain that is transmitted and induced in a non-circularly-symmetrical manner into said optical fiber causes said Bragg grating to be birefringent in that two distinct polarization axes will be formed in said optical fiber, so that a light wave in said optical fiber will experience respective different refractive indices depending on a polarization oscillation direction of said light wave.

31. A method of fabricating a sensor arrangement for determining a temperature and a strain, said sensor arrangement including:
   a substrate having a substrate surface;
   an optical sensor arranged directly or indirectly on said substrate surface, wherein said optical sensor comprises at least one optical fiber including a fiber core and a fiber cladding, and a Bragg grating formed in a sensor section of said optical fiber; and
   a cover layer applied onto said substrate and said optical fiber such that said optical fiber is embedded in and at least partially surrounded by said cover layer and secured thereby onto said substrate, and such that a force-transmitting connection is established between said substrate, said cover layer and said optical fiber; and
   wherein said optical sensor is birefringent due to a non-circularly-symmetrical thermomechanical strain that has been transmitted and induced from said cover layer into said optical fiber;
   said method comprising the following steps:
   a) providing an adhesive carrier that has an adhesive on one surface thereof and that has a plurality of holes therein arranged along at least one straight or curved row of said holes;
   b) positioning and adhering said optical fiber onto said adhesive to extend along said row of holes;
   c) positioning said adhesive carrier with said optical fiber adhered thereon relative to said substrate so that said optical fiber is positioned on said substrate surface;
   d) applying a binder substance through said holes in said adhesive carrier, onto said optical fiber and said substrate surface, and then curing said binder substance so as to at least spot-wise secure said optical fiber to said substrate surface by said binder substance;
   e) after completion of said step d), peeling said adhesive carrier of f of said optical fiber and said substrate while leaving said optical fiber secured onto said substrate surface; and
   f) after said step e), applying at least one layer of a coating material onto said optical fiber and onto said substrate surface, and then curing said coating material to form thereof said cover layer in which said optical fiber is embedded and by which said optical fiber is fixed onto said substrate surface.

32. The method according to claim 31, wherein said step a) comprises providing said adhesive carrier in the form of an elongated adhesive strip, and cutting said holes in said strip as a row of said holes with a defined hole size and a defined hole spacing along a centerline in the center of a width of said strip.

33. The method according to claim 31, wherein said step a) comprises providing said adhesive carrier in the form of an elongated adhesive strip, and cutting said holes in said strip as a plurality of parallel rows of said holes with a defined hole size and a defined hole spacing parallel to an elongated extension direction of said strip.

34. The method according to claim 31, wherein said step a) comprises providing said adhesive carrier in the form of a surfacially extending sheet of an adhesive film, and cutting said holes as a chain of said holes having a defined hole size and a defined periodic hole spacing.

35. The method according to claim 31, wherein said step b) comprises unrolling said optical fiber from a fiber supply spool, unrolling said adhesive carrier from an adhesive carrier supply spool, guidedly bringing together said optical fiber and said adhesive carrier so that said optical fiber is pressed and adhered onto said adhesive to extend along said row of holes using a fiber fixing device, and then rolling-up said adhesive carrier with said optical fiber adhered thereon onto a take-off spool.

36. The method according to claim 31, wherein said step b) is carried out automatically under a computer control.

37. The method according to claim 31, wherein said step b) comprises positioning and adhering a plurality of said optical fibers respectively along a respective plurality of said rows of said holes, wherein a pattern of said holes provides a predefined guide pattern for properly positioning said optical fibers on said adhesive.

38. The method according to claim 31, wherein said step e) absolutely avoids and excludes pulling any portion of said optical fiber off from said substrate surface while peeling off said adhesive carrier.

* * * * *

UNITED STATES PATENT AND TRADEMARK OFFICE
CERTIFICATE OF CORRECTION

PATENT NO. : 6,587,188 B2
DATED : July 1, 2003
INVENTOR(S) : Gleine et al.

It is certified that error appears in the above-identified patent and that said Letters Patent is hereby corrected as shown below:

Column 1,
Line 50, after "to", insert -- extend the useful operating time of the vehicle, such as an --;

Column 9,
Line 4, before "so" replace "Layers 3," by -- layers 3, --;

Column 11,
Line 29, after "fiber," replace "$\epsilon$" by -- "$\alpha$" --;

Column 15,
Line 53, after "strain" replace "E" by -- $\epsilon$ --;
Line 55, after "to" replace "$\Delta\Lambda_B/\Lambda_{BO}=(1-p^{eff})*\epsilon_1+(\alpha*p^{eff}+1/n_0*dn/dT)*\Delta T$" by -- $\Delta\lambda_B/\lambda_{BO}=(1-p^{eff})*\epsilon_1+(\alpha*p^{eff}+1/n_0*dn/dT)*\Delta T$ --
Line 57, after "relationship" replace "$\Delta\Lambda_B=K_c*\epsilon+K_T*\Delta T$" by -- $\Delta\lambda_B=K_c*\epsilon+K_T*\Delta T$ --

Signed and Sealed this

Twenty-fifth Day of November, 2003

JAMES E. ROGAN
*Director of the United States Patent and Trademark Office*